(12) United States Patent
Li et al.

(10) Patent No.: US 10,630,155 B2
(45) Date of Patent: Apr. 21, 2020

(54) SINGLE PHASE PERMANENT MAGNET MOTOR

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 288 days.

(21) Appl. No.: 15/243,067

(22) Filed: Aug. 22, 2016

(65) Prior Publication Data
US 2017/0063184 A1 Mar. 2, 2017

(30) Foreign Application Priority Data

Aug. 28, 2015 (CN) .......................... 2015 1 0543827

(51) Int. Cl.
| | |
|---|---|
| *H02K 1/27* | (2006.01) |
| *H02K 21/14* | (2006.01) |
| *H02K 29/03* | (2006.01) |
| *H02K 1/14* | (2006.01) |

(52) U.S. Cl.
CPC ............. *H02K 21/14* (2013.01); *H02K 29/03* (2013.01); *H02K 1/14* (2013.01); *H02K 1/2706* (2013.01)

(58) Field of Classification Search
CPC ........ H02K 1/14; H02K 1/2706; H02K 21/14; H02K 29/03

USPC ...... 310/216.069, 216.074, 26.079, 216.091, 310/216.096, 216.099, 216.101, 216.102, 310/216.106, 254.1, 156.01

See application file for complete search history.

(56) References Cited

U.S. PATENT DOCUMENTS

| | | | | |
|---|---|---|---|---|
| 3,056,896 | A * | 10/1962 | Ludemann | ............. H02K 17/04 310/185 |
| 3,257,572 | A * | 6/1966 | Heilmann | ............. H02K 1/146 310/190 |
| 4,496,887 | A * | 1/1985 | Ichihara | ................. H02K 29/08 310/156.46 |

(Continued)

FOREIGN PATENT DOCUMENTS

WO    WO 84/03007    8/1984

*Primary Examiner* — Jermele M Hollington
*Assistant Examiner* — Ahmed Elnakib
(74) *Attorney, Agent, or Firm* — Muncy, Geissler, Olds & Lowe, P.C.

(57) ABSTRACT

A single phase permanent magnet motor includes a stator and a rotor. The stator includes a stator core and a stator winding. The stator core includes an outer yoke, teeth extending inwardly from the outer yoke, and pole shoes extending from inner ends of the teeth. The rotor is received in a space cooperatively defined by the pole shoes. The rotor includes circumferentially arranged permanent magnetic poles. An outer circumferential surface of the permanent magnetic poles is concentric with an inner circumferential surface of the pole shoes, such that a uniform air gap is formed between the pole shoes and magnetic poles. The single phase permanent magnet motor forms the uniform air gap, which reduces the vibration and noise. The pole shoes form invisible positioning slots, which avoids the negative effect of the positioning slots to the thickness of the air gap and reduces the startup dead point.

17 Claims, 9 Drawing Sheets

(56) References Cited

U.S. PATENT DOCUMENTS

| | | | | |
|---|---|---|---|---|
| 4,499,407 | A * | 2/1985 | MaCleod | G11B 19/2009 310/156.26 |
| 4,698,537 | A * | 10/1987 | Byrne | H02K 1/246 310/168 |
| 4,896,066 | A * | 1/1990 | Tomite | H02K 1/26 310/214 |
| 5,250,867 | A * | 10/1993 | Gizaw | H02K 21/16 310/156.12 |
| 5,670,836 | A * | 9/1997 | Horst | H02K 21/16 310/156.15 |
| 6,064,132 | A * | 5/2000 | Nose | H02K 1/08 310/216.016 |
| 6,703,748 | B2 * | 3/2004 | Arai | H02K 1/146 310/179 |
| 6,720,686 | B1 * | 4/2004 | Horst | H02K 29/03 310/254.1 |
| 6,809,439 | B2 | 10/2004 | Iwase et al. | |
| 6,858,960 | B1 * | 2/2005 | Muszynski | H02K 29/03 310/156.38 |
| 6,858,965 | B2 * | 2/2005 | Muller | H02K 1/148 310/216.008 |
| 2006/0273667 | A1 | 12/2006 | Horng et al. | |
| 2009/0320704 | A1 * | 12/2009 | Izume | B41F 31/02 101/367 |
| 2011/0043067 | A1 * | 2/2011 | Li | H02K 1/141 310/158 |
| 2012/0025665 | A1 * | 2/2012 | Takahashi | H02K 1/146 310/216.094 |
| 2013/0088114 | A1 | 4/2013 | Yamashita et al. | |
| 2015/0042194 | A1 * | 2/2015 | Li | H02K 21/16 310/156.01 |

* cited by examiner

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510543827.1 filed in The People's Republic of China on 28 Aug. 2015.

FIELD OF THE INVENTION

The present invention relates to a single phase permanent magnet motor, and in particular to a single phase permanent magnet motor having an even air gap.

BACKGROUND OF THE INVENTION

In a conventional single phase permanent magnet motor, a stator core is provided as an integral structure, i.e. the stator core includes a yoke and teeth extending inwardly from the yoke, and the yoke and the teeth are formed at the same time into an integral structure. Slot openings are formed between pole shoes of the adjacent teeth. The presence of the slot openings can make the motor generate an unduly large cogging torque. The cogging torque can result in the motor generating vibration and noise. Furthermore, because of the limitation of the slot openings, the motor has a small startup angle and poor startup reliability.

SUMMARY OF THE INVENTION

Thus, there is a desire for a new single phase motor with improved startup reliability.

A single phase motor is provided which includes a stator comprising a stator core and a stator winding wound around the stator core, the stator core comprising an outer yoke, a plurality of teeth extending inwardly from the outer yoke, pole shoes extending from inner ends of the teeth in circumferential directions, the pole shoes cooperatively defining a space there between; and a rotor rotatable relative to the stator, the rotor received in the space, with an air gap formed between the pole shoes and the rotor for allowing the rotor to rotate relative to the stator, the rotor comprising magnetic poles arranged along a circumferential direction of the rotor. Wherein the pole shoes form positioning slots such that when the stator winding is de-energized a middle radial line of the magnetic pole is offset from a middle radial line of a selected tooth, the positioning slots being covered by inner circumferential surfaces of the pole shoes.

Preferably, the inner circumferential surfaces of the pole shoes are coaxial with a center axis of the rotor.

Preferably, outer circumferential surfaces of the magnetic poles of the rotor are concentric with the inner circumferential surfaces of the pole shoes.

Alternatively, a distance from an outer circumferential surface of the permanent magnet to the center axis of the rotor decreases from a central portion of the outer circumferential surface to end portions of the outer circumferential surface.

Preferably, the outer circumferential surface of the magnetic pole is symmetrical about a middle radial line of the magnetic pole.

Preferably, the positioning slots are blind holes or through holes extending in the pole shoes along an axial direction of the motor.

Preferably, the rotor comprises a rotor core, and the magnetic poles of the rotor are formed by a plurality of permanent magnets or an annular permanent magnet mounted to the rotor core.

Preferably, adjacent pole shoes are connected together to form a closed inner ring portion, an inner circumferential surface of the inner ring portion is located on a cylindrical circumferential surface, and a magnetic bridge is disposed at a part of the inner ring portion between each two adjacent teeth.

Preferably, each magnetic bridge is disposed at a middle position between two adjacent teeth or is offset from the middle position in a direction away from the positioning slot.

Preferably, the inner ring portion has a through hole extending along an axial direction of the motor at a region corresponding to each magnetic bridge or has a groove at an outer surface of a region corresponding to each magnetic bridge.

Preferably, the magnetic bridge has a maximum magnetic reluctance at the middle position between the two adjacent teeth.

Preferably, the teeth are separately formed from one or both of the inner ring portion and the yoke.

Preferably, the pole shoe located between each pair of adjacent teeth is provided with one of the positioning slots, the positioning slot extends continuously or discontinuously along an axial direction of the motor, and each positioning slot is spaced from the two adjacent teeth by different distances.

Preferably, the number of the positioning slots is the same as the number of the magnetic poles.

Preferably, the pole shoes are connected to form a closed inner ring portion, a magnetic bridge is disposed at a part of the inner ring portion between each two adjacent teeth, and the inner ring portion has a magnetic reluctance at the magnetic bridge greater than a magnetic reluctance at the positioning slot.

Preferably, a center of the positioning slot is offset from a symmetrical center of a corresponding pair of teeth by an electric angle ranging from 45 degrees to 135 degrees.

DETAILED DESCRIPTION OF THE PREFERRED EMBODIMENTS

Figure 1:
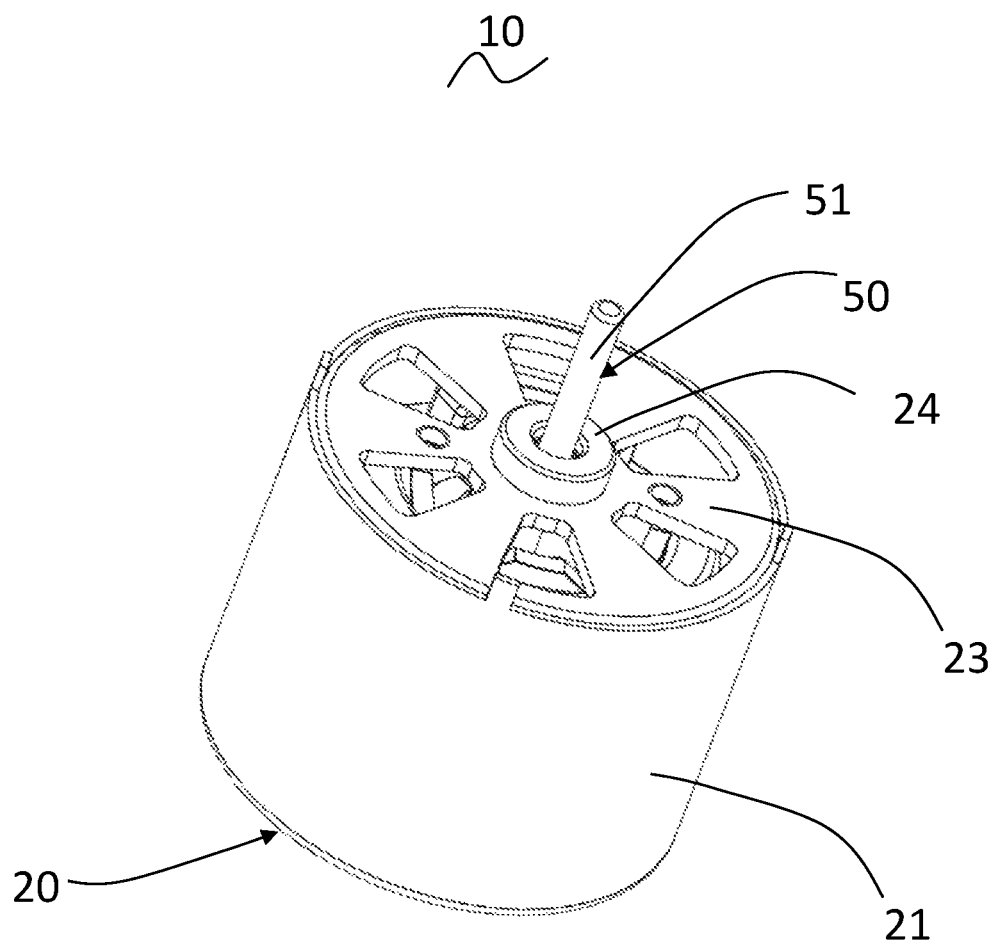
FIG. 1 illustrates a single phase permanent magnet motor according to a first embodiment of the present invention.
Figure 2:
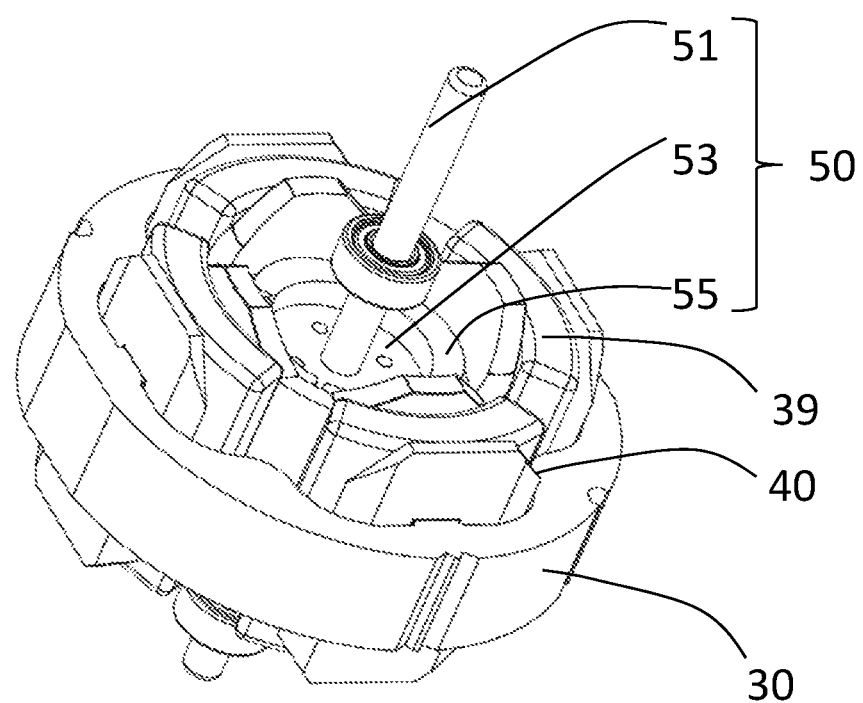
FIG. 2 illustrates the single phase permanent magnet motor of FIG. 1, with the outer housing being removed.
Figure 3:
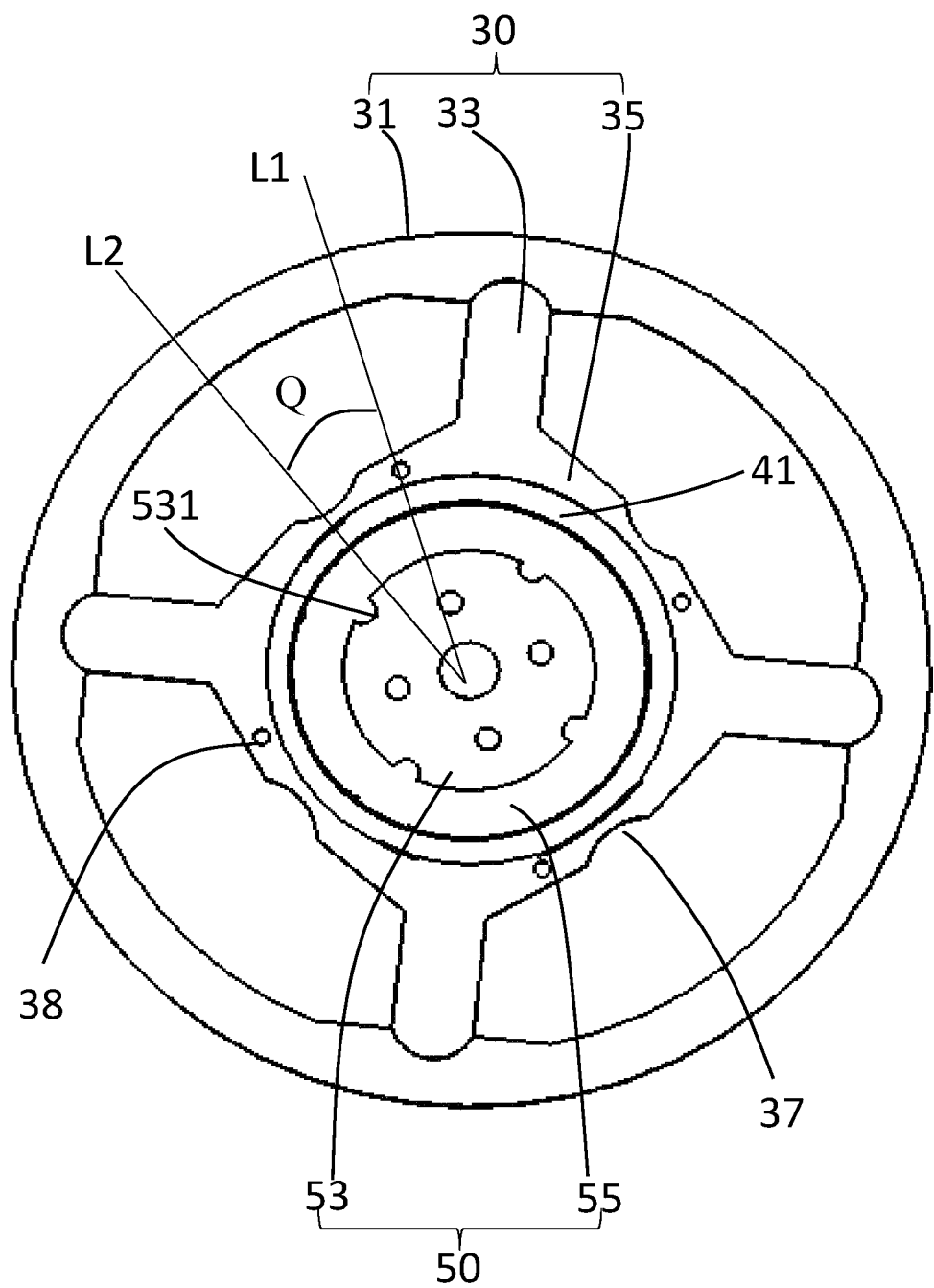
FIG. 3 illustrates the single phase permanent magnet motor of FIG. 1, with the outer housing, stator winding and rotary shaft being removed.
Figure 4:
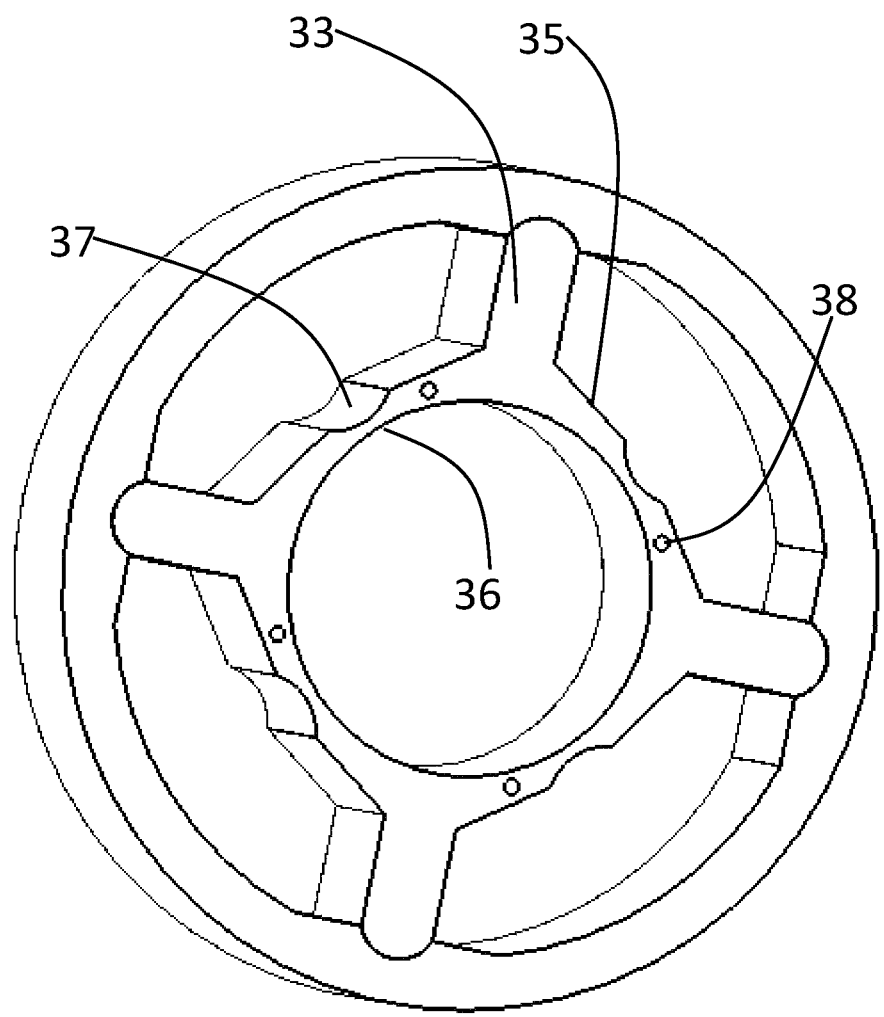
FIG. 4 illustrates the stator winding of the single phase permanent magnet motor of FIG. 1.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

First Embodiment

Referring to FIG. 1 to FIG. 5, a single phase motor 10 in accordance with the first embodiment of the present invention includes a stator 20 and a rotor 50 rotatable relative to the stator 20. Preferably, the motor is a single phase brushless permanent magnet motor.

The stator 20 includes a cylindrical outer housing 21 with one open end, an end cap 23 mounted to the open end of the outer housing 21, a stator core 30 mounted in the outer housing 21, an insulating bracket 40 mounted to the stator core 30, and a winding 39 wound around the stator core and supported by the insulating bracket 40. The stator core 30 includes an outer yoke 31, a plurality of teeth 33 extending inwardly from the outer yoke 31, a pole shoe 35 extending from a radial inner end to two sides of each tooth 33 along a circumferential direction of the stator. In this embodiment, the outer yoke 31 is in the form of a closed ring and is thus called an outer ring portion of the stator. The pole shoes 35 are also connected into a closed ring and are thus called an inner ring portion of the stator. The winding 39 is preferably wound around the respective teeth 33, and is isolated from the stator core 30 by the insulating bracket 40.

The rotor 50 is received in a space cooperatively defined by the pole shoes 35 of the teeth, with an air gap 41 formed between the pole shoes 35 and the rotor 50. The rotor 50 includes a plurality of magnetic poles 55 disposed along a circumferential direction of the rotor. Preferably, the outer circumferential surfaces of the magnetic poles 55 are concentric with an inner circumferential surface of the pole shoes 35, thus defining an even air gap there between. Specifically, the inner surface of the pole shoes 35 is located on a circle centered at the center of the rotor 50. The outer surfaces 56 of the magnetic poles 55 are located on a circle centered at the center of the rotor 50. That is, the inner circumferential surface of the inner ring portion formed by the pole shoes of the stator 30 is concentric with the outer circumferential surfaces of the magnetic poles 55 of the rotor, thus defining the even air gap between the inner circumferential surface of the inner ring portion and the outer circumferential surfaces of the magnetic poles.

Figure 5:
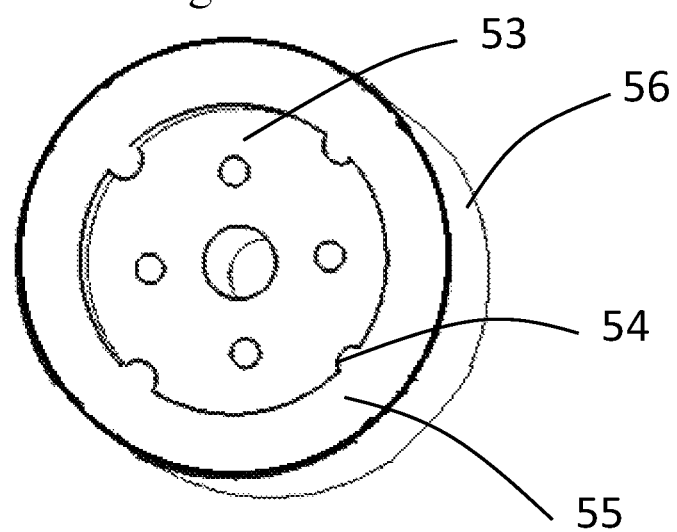
FIG. 5 illustrates the rotor core of the single phase permanent magnet motor of FIG. 1 and its permanent magnet.

Referring to FIG. 5, in this embodiment, the permanent magnetic poles 55 is formed by a single annular permanent magnet. In addition, the rotor 50 further includes a rotary shaft 51. One end of the rotary shaft 51 is mounted to the end cap 23 through a bearing 24, and the other end is mounted to a bottom of the cylindrical outer housing 21 of the stator through another bearing, such that the rotor is capable of rotation relative to the stator.

In this embodiment, the rotor 50 further includes a rotor core 53. The rotary shaft 51 passes through a center of the rotor core 53 and the rotor core 53 is fixed to the shaft 51. The permanent magnet is mounted to an outer circumferential surface of the rotor core 53. The outer circumferential surface of the rotor core 53 are formed with a plurality of axially-extending grooves 54. Each groove 54 is disposed at a junction of two adjacent permanent magnetic poles to reduce magnetic leakage.

The stator core 30 is made of a magnetic-conductive material. For example, the stator core 30 is formed by stacking magnetic laminations (silicon laminations commonly used in the industry) along an axial direction of the motor. Preferably, the teeth 33 are spacingly and uniformly arranged along the circumferential direction of the motor. Inner surfaces of the inner ends of the pole shoes 35 are located on a circle centered at the center of the rotor 50, and adjacent pole shoes 35 are connected to form the closed inner ring portion. Magnetic bridges 36 with a larger magnetic reluctance are formed at segments of the inner ring portion between adjacent teeth 33. Preferably, the magnetic bridge 36 is located at a middle position between the corresponding two adjacent teeth.

In this embodiment, the inner ring portion has a radial thickness at the magnetic bridge less than a radial thickness of other parts of the inner ring portion, thus increasing the magnetic reluctance of the magnetic bridge 36. Specifically, a groove 37 is formed on an outer circumferential surface of the inner ring portion at a region corresponding to each magnetic bridge 36. The number of the groove 37 associated with each magnetic bridge 36 is one. The groove 37 can have an arc shape, square shape or another suitable shape.

In this embodiment, the pole shoe 35 between each two adjacent teeth 35 forms a positioning slot 38. The number of the positioning slots 38 is the same as the number of poles of the stator and the number of the rotor permanent magnetic poles, and is four in this embodiment. In the present embodiment, the stator winding is a concentrated winding and, therefore, the number of the teeth is the same as the number of the poles of the stator. In an alternative embodiment, one stator winding may span over multiple teeth, and the multiple teeth correspond to one stator pole. As such, the number of the stator teeth can be an integer times of the number of the stator poles, i.e. twice, three times or the like. In this embodiment, the positioning slots 38 extend along the axial direction of the motor, and are disposed between the outer circumferential surface and inner circumferential surface of the inner ring portion formed by connecting the pole shoes. Therefore, the positioning slots 38 are referred to as hidden positioning slots, i.e. they are not exposed from the outer circumferential surface or inner circumferential surface of the inner ring portion. Preferably, the positioning slots 38 are disposed closer to but covered/hidden by the inner circumferential surface. In an alternative embodiment, the positioning slots 38 extend continuously along the axial direction of the motor. Preferably, each positioning slot 38 has a center offset from a symmetrical center of the corresponding two adjacent teeth, i.e. the positioning slot 38 is spaced apart from the two teeth by different distances, such that when the stator winding is not energized, the rotor can stop at a position offset from a dead point. A dead point refers to a position where the torque applied to the rotor is zero when the stator winding is energized. Preferably, the center of each positioning slot 38 is angularly offset from the symmetrical center of the corresponding two adjacent teeth by an electric angle Q ranging from 45 to 135 degrees. That is, a line L1 passing the center of the positioning slot 38 and the center of the rotor and a symmetrical center line L2 of the adjacent teeth 33 form the angle Q therebetween.

When the motor is not energized, neutral regions between adjacent rotor magnetic poles are not aligned with the symmetrical centers of the corresponding two adjacent teeth 33, but rather are aligned with the positioning slots 38 of the pole shoes, respectively. Therefore, the above mentioned angle Q formed between the line L1 and line L2 is also referred to as a startup angle. In this embodiment, the startup angle is greater than a 45-degree electric angle and less than a 135-degree electric angle. When the stator winding 39 of the motor is supplied with an electric current with one direction, the rotor 50 can be started along one direction. When the stator winding 39 of the motor is supplied with an electric current with an opposite direction, the rotor 50 can be started along an opposite direction. It should be understood that, when the startup angle is a 90-degree electric angle (i.e. the positioning slot 38 is aligned with the middle radial line of the tooth, and the center of the rotor magnetic pole and the symmetrical center of the corresponding adjacent teeth 33 coincide with each other), the rotor 50 can be easily started in both directions, i.e. it is the easiest angle to achieve bidirectional startup. When the startup angle is offset from the 90-degree electric angle, the rotor is easier to start in one direction than in the opposite direction. It has been found from a large number of experiments that, when the startup angle is in the range of 45-degree to 135-degree electric angle, the startup of the rotor in both directions has good reliability.

Second Embodiment

Figure 6:
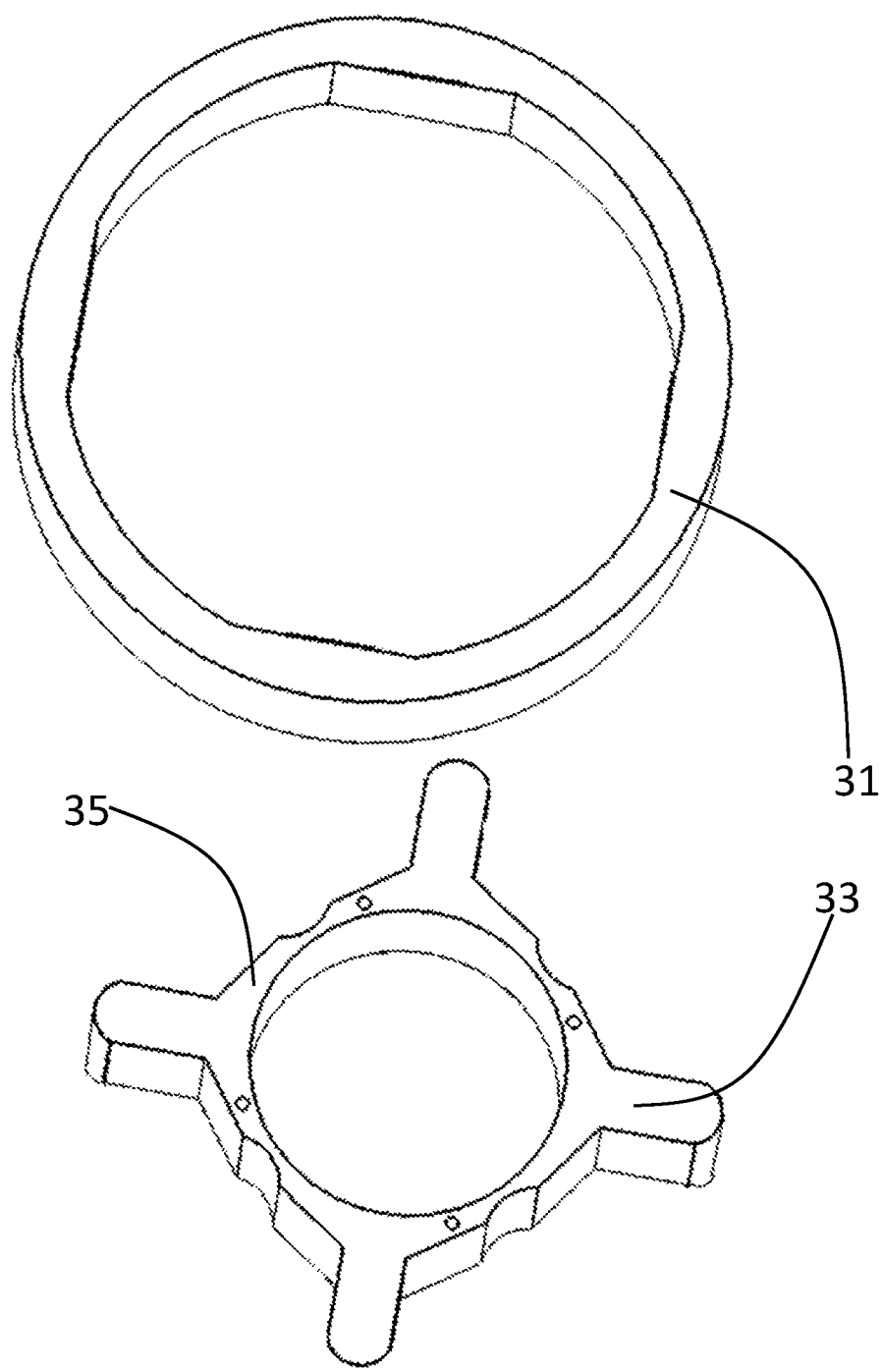
FIG. 6 illustrates a separate-type stator core according to a second embodiment of the present invention.

Referring to FIG. 6, this embodiment differs from the above embodiment in that the stator core of this embodiment is of a separate-type structure in order to increase the winding efficiency of the stator winding 39. Specifically, the teeth 33 and the inner ring portion are integrally formed into an integral structure, and the teeth 33 and the outer yoke 31 are separate structures, i.e. the outer yoke 31 and the teeth 33 are separately formed and then assembled together. It should be understood that each tooth 33 may be fixedly connected to the outer yoke 31 by welding or various mechanical connecting manners (e.g. a dovetail joint). In an alternative embodiment, the teeth 33, yoke 31 and inner ring portion are all separately formed, and the teeth 33 are fixedly connected to the yoke 31 and the inner ring portion after the stator winding 39 is wound.

Third Embodiment

Figure 7:
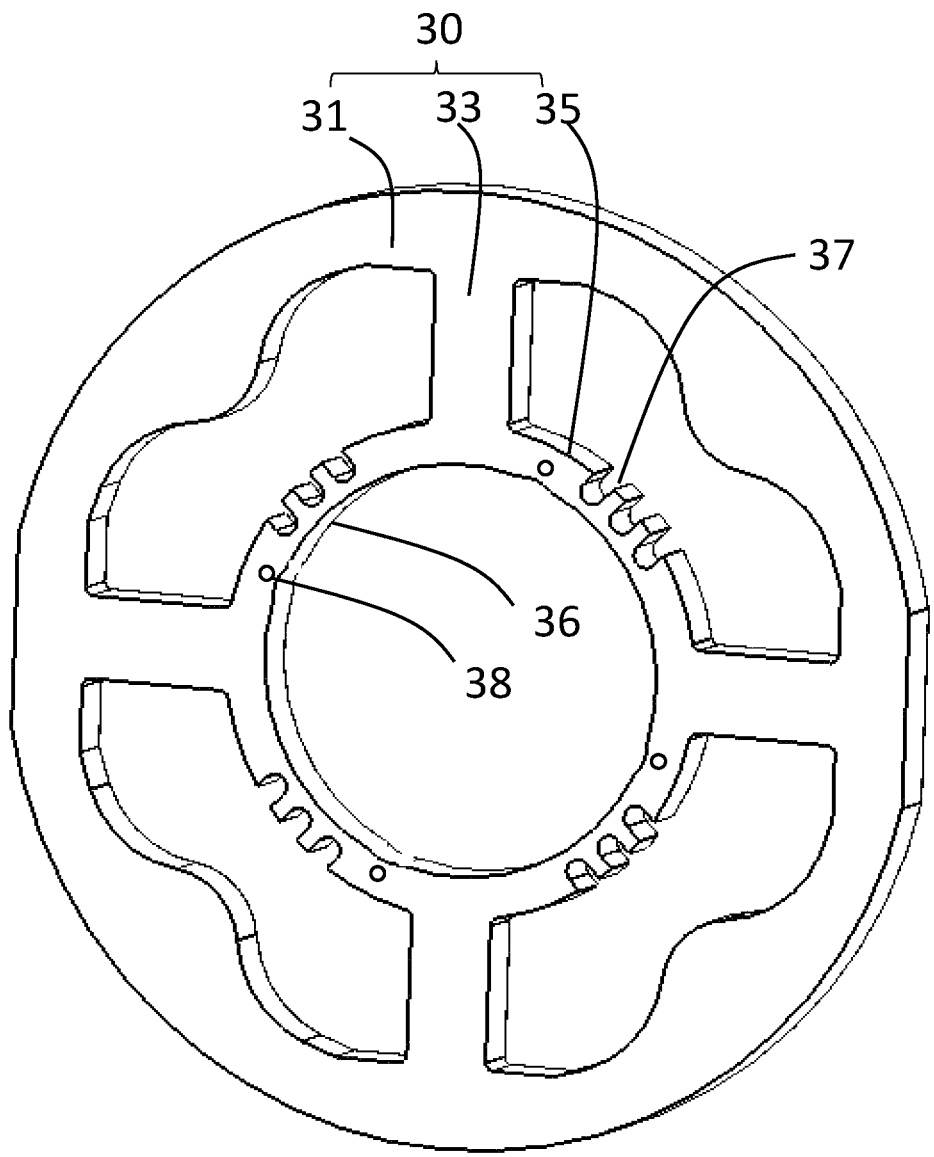
FIG. 7 illustrates a stator core according to a third embodiment of the present invention.
Figure 8:
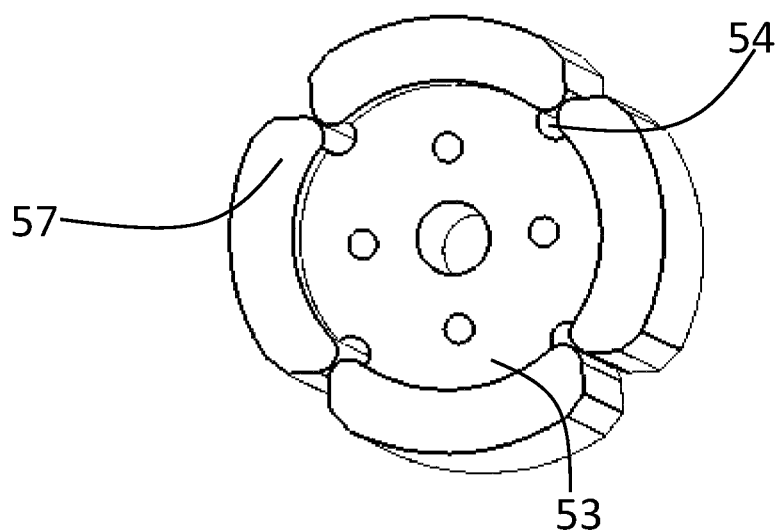
FIG. 8 illustrates the stator core and its permanent magnet according to the third embodiment of the present invention.

Referring to FIG. 7 and FIG. 8, one difference between this embodiment and the first embodiment is that, in this embodiment, grooves 37 are formed on the outer circumferential surface of the inner ring portion at a region corresponding to each magnetic bridge 36. The number of the grooves 37 corresponding each magnetic bridge 36 is greater than one, for example, three. The magnetic bridge 36 has a maximum magnetic reluctance at a middle position between the two adjacent teeth. For example, when each magnetic bridge has three grooves, the groove farther away from the tooth 33 has a larger size. That is, the closer the groove is to the tooth 33, the smaller size (especially the radial depth) the groove has; the farther the groove is from the tooth 33, the larger size (especially the radial depth) the groove has. Because the magnetic bridge 36 is disposed on the inner ring portion between the two adjacent teeth 33, the groove at the middle portion between the two adjacent teeth 33 has the largest size.

In this embodiment, the pole shoes 35 between the two adjacent teeth likewise have positioning slots 38. The positioning slots 38 are blind holes or through holes extending in the axial direction of the motor and disposed between the outer circumferential surface and the inner circumferential surface.

In addition, the magnetic poles of this embodiment are formed by a plurality of arc permanent magnets 57, for example, four arc permanent magnets 57. The plurality of arc permanent magnets 57 is mounted to the outer circumferential surface of the rotor core 53. Likewise, the outer circumferential surface of the rotor core is provided with axially-extending grooves 54 each disposed at a junction of two adjacent permanent magnets 57 to reduce magnetic leakage. Preferably, the outer circumferential surfaces of the permanent magnets 57 are coaxial with the center of the rotor shaft 51 such that an even air gap is formed between the inner circumferential surface of the inner ring portion of the stator core and the outer circumferential surfaces of the magnetic poles 57 of the rotor. Alternatively, the outer circumferential surface of the permanent magnet 57 is not coaxial with the center of the rotor shaft 51. For example, the distance from the outer circumferential surface of the permanent magnet 57 to the center of the rotor shaft decreases from a central portion of the outer circumferential surface to end portions of the outer circumferential surface. Preferably, the outer circumferential surface of the magnetic pole 57 is symmetrical with about the middle radial line of the magnetic pole 57.

Fourth Embodiment

Figure 9:
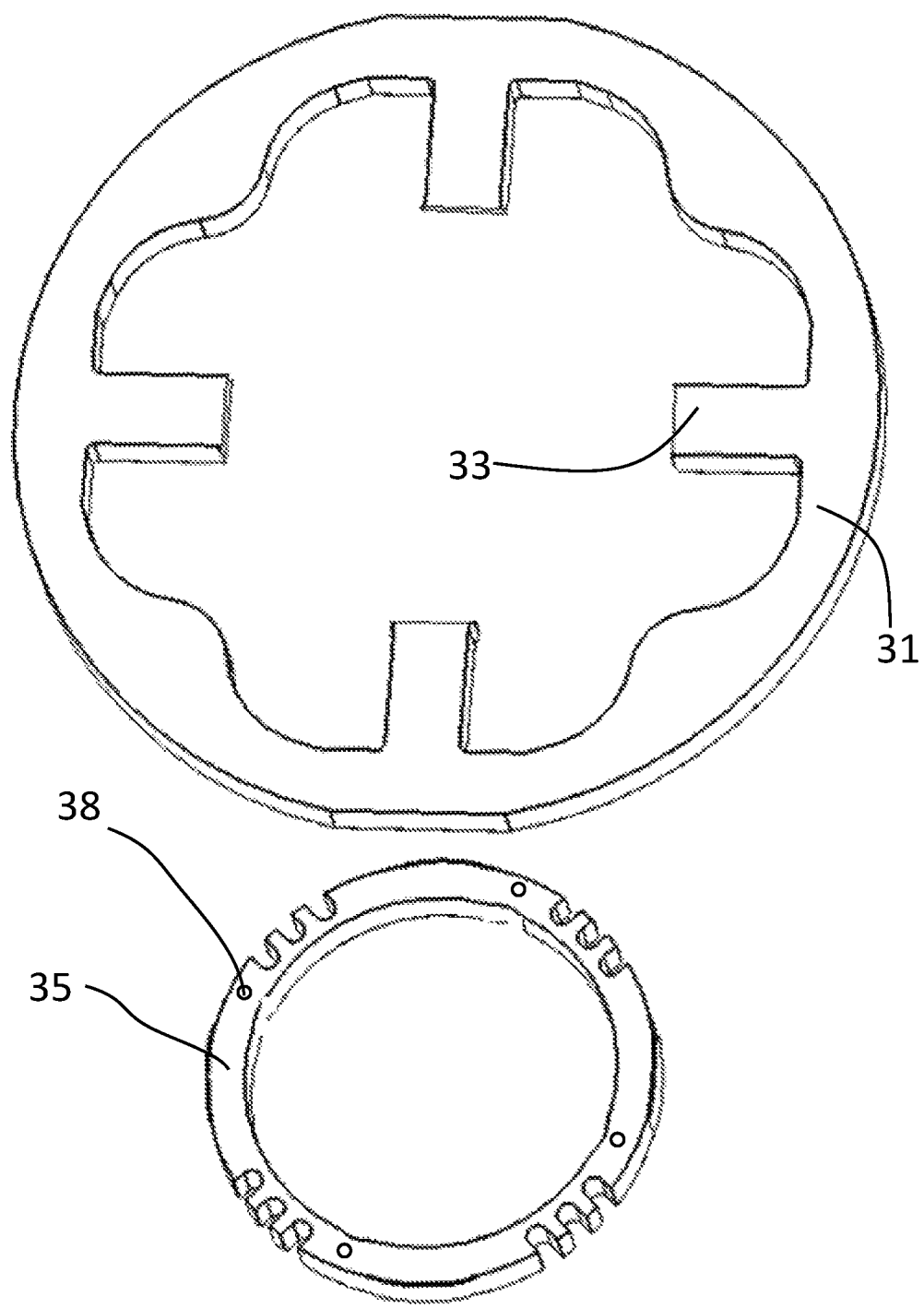
FIG. 9 illustrates a separate-type stator core according to a fourth embodiment of the present invention.

FIG. 9 illustrates a separate-type stator core according to a fourth embodiment of the present invention.

This embodiment differs from the third embodiment in that the stator core of this embodiment is of a separate-type structure in order to increase the winding efficiency of the stator winding 39. Specifically, the teeth 33 and yoke 31 are integrally formed into an integral structure, and the teeth 33 and the inner ring portion are separate structures, i.e. the inner ring portion and the teeth 33 are separately formed and then assembled together. It should be understood that each tooth 33 may be fixedly connected to the inner ring portion by welding or various mechanical connecting means (e.g. a dovetail joint). In an alternative embodiment, the teeth 33, yoke 31 and inner ring portion are all separately formed, and the teeth 33 are fixedly connected to the yoke 31 and the inner ring portion after the stator winding 39 is wound.

Fifth Embodiment

Figure 10:
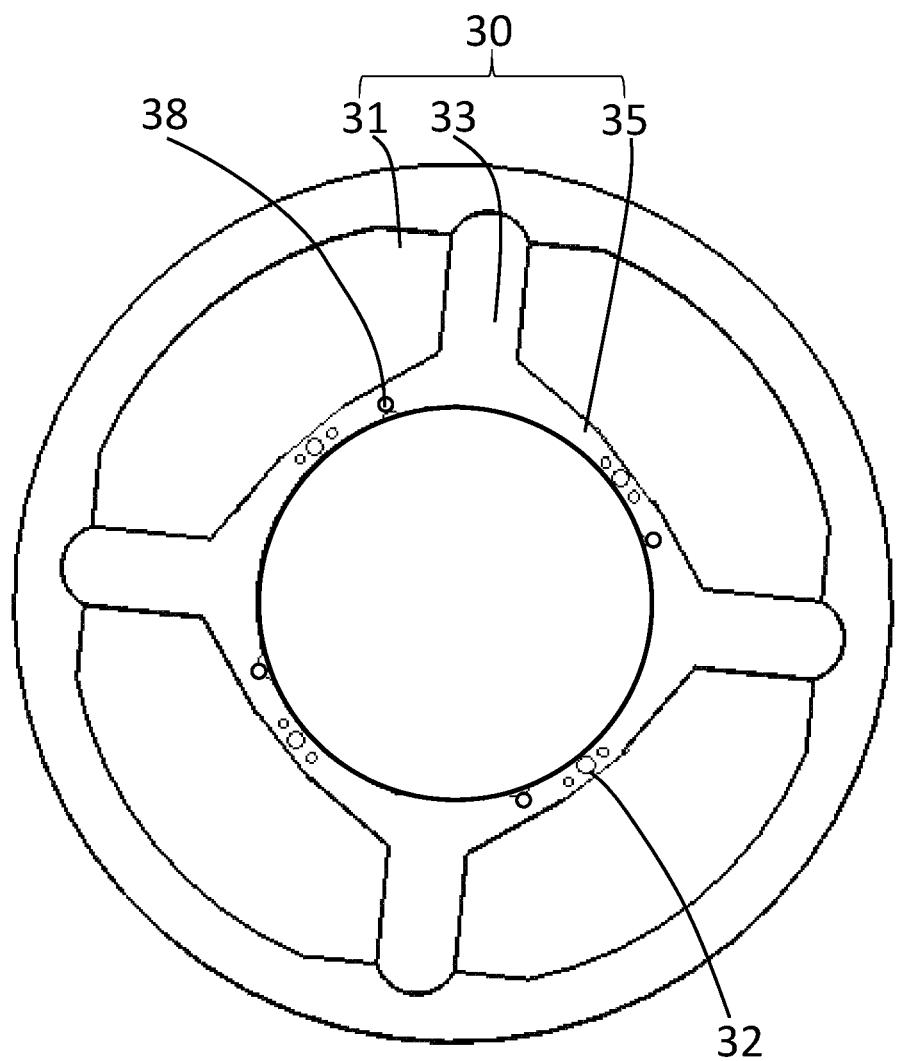
FIG. 10 illustrates a stator core according to a fifth embodiment of the present invention.

FIG. 10 illustrate a stator core according to a fifth embodiment of the present invention.

Different from the third embodiment, in this embodiment, through holes 32 are formed in the inner ring portion at a region corresponding to each magnetic bridge 36. The number of the through holes 32 may be one or more. The magnetic bridge 36 has a maximum magnetic reluctance at a middle position between the two adjacent teeth. For example, when each magnetic bridge has three through holes, the through hole farther away from the tooth 33 has a larger size. That is, the closer the through hole is to the tooth 33, the smaller size (especially a diameter of the through hole) the through hole has; the farther the through hole is from the tooth 33, the larger size (especially diameter of the through hole) the through hole has. Because the magnetic bridge 36 is disposed on the inner ring portion between the two adjacent teeth 33, the through hole at the middle portion between the two adjacent teeth 33 has the largest diameter.

It should be noted that, in all the above embodiments, the inner ring portion formed by connecting the pole shoes 35 of the teeth has a radial size at the magnetic bridge 36 less than at the positioning slot 38. Even though the positioning slot 38 is formed, the inner ring portion has the largest magnetic reluctance at the magnetic bridge 36.

In the embodiments of the present invention, the single phase permanent magnet motor includes the annular permanent magnetic pole, and the inner surface of the pole shoes of the stator core is located on a circle centered at the center of the rotor, such that the even air gap can be more easily formed, which reduces the vibration and noise generated due to the slot openings formed between adjacent pole shoes in the prior art. In addition, the startup angle and the cogging torque needed during startup can be easily adjusted according to desire requirements, thus reducing or eliminating the startup dead points and hence increasing the reliability of the motor startup. For example, the motor startup angle can be easily adjusted by adjusting the position of the positioning slot of the inner ring portion. When the startup angle Q is greater than a 45-degree electric angle and less than a 135-degree electric angle, the motor rotor can achieve bidirectional startup. By adjusting the shape, size and depth of the positioning slot of the inner ring portion, the cogging torque of the motor before startup can be adjusted. The inner ring portion of the stator core is a continuous structure, and parts of the inner ring portion between two adjacent teeth are connected by the magnetic bridge, which avoids the sudden change of magnetic reluctance due to the slot openings formed between the pole shoes of the conventional stator, such that the cogging torque of the motor can be reduced. The stator core is of a separate-type structure, such that the winding process can be performed by using a double flier winding machine prior to the assembly of the teeth and the yoke, which increases the winding efficiency.

In the present invention, the term "ring portion" refers to a closed structure formed by extending continuously along a circumferential direction.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase motor comprising:
    a stator comprising a stator core and a stator winding wound around the stator core, the stator core comprising a plurality of teeth and pole shoes extending from inner ends of the teeth in circumferential directions, the pole shoes cooperatively defining a space there between; and
    a rotor rotatably received in the space of the stator with an air gap formed between the pole shoes and the rotor for allowing the rotor to rotate relative to the stator, the rotor comprising magnetic poles arranged along a circumferential direction of the rotor,
    wherein positioning slots are formed in pole shoes located between each pair of adjacent teeth, the positioning slots are covered by inner circumferential surfaces of the pole shoes, one edge of the positioning slot does not reach a part of the pole shoe facing the winding portion, opposite edge of the positioning slot does not reach an end of the pole shoe, such that when the stator winding is de-energized a middle radial line of the magnetic pole is offset from a middle radial line of a corresponding tooth, adjacent pole shoes are connected together to form a closed inner ring, the magnetic poles of the rotor are formed by a single annular permanent magnet, a uniform air gap is formed between the pole shoes of the stator and magnetic poles of the rotor.

2. The single phase motor of claim 1, wherein the inner circumferential surfaces of the pole shoes are coaxial with a center axis of the rotor.

3. The single phase motor of claim 2, wherein outer circumferential surfaces of the magnetic poles of the rotor are concentric with the inner circumferential surfaces of the pole shoes.

4. The single phase motor of claim 2, wherein a distance from an outer circumferential surface of the magnetic poles of the rotor to the center axis of the rotor decreases from a central portion of the outer circumferential surface to end portions of the outer circumferential surface.

5. The single phase motor of claim 4, wherein the outer circumferential surface of the magnetic pole is symmetrical about a middle radial line of the magnetic pole.

6. The single phase motor of claim 1, wherein the positioning slots are blind holes or through holes extending in the pole shoes along an axial direction of the motor.

7. The single phase motor of claim 1, wherein the rotor comprises a rotor core, and the magnetic poles of the rotor are formed by a plurality of permanent magnets or an annular permanent magnet mounted to the rotor core.

8. The single phase motor of claim 1, wherein an inner circumferential surface of the inner ring is located on a cylindrical circumferential surface, and a magnetic bridge is disposed at a part of the inner ring between each two adjacent teeth.

9. The single phase motor of claim 8, wherein each magnetic bridge is offset from the middle position in a direction away from the positioning slot.

10. The single phase motor of claim 8, wherein the inner ring has a through hole extending along an axial direction of the motor at a region corresponding to each magnetic bridge or has a groove at an outer surface of a region corresponding to each magnetic bridge.

11. The single phase motor of claim 10, wherein the magnetic bridge has a larger magnetic reluctance at the middle position of the inner ring between each two adjacent teeth than at a portion of the inner ring that has no grooves or through holes.

12. The single phase motor of claim 8, wherein the stator core further comprises an outer yoke, the teeth extend inwardly from the outer yoke, and the teeth are separately formed from one or both of the inner ring portion and the yoke.

13. The single phase motor of claim 1, wherein the pole shoe located between each pair of adjacent teeth is provided with one of the positioning slots, the positioning slot extends continuously or discontinuously along an axial direction of the motor, and each positioning slot is spaced from the two adjacent teeth by different distances.

14. The single phase motor of claim 13, wherein the number of the positioning slots is the same as the number of the magnetic poles.

15. The single phase motor of claim 13, wherein a magnetic bridge is disposed at a part of the inner ring between each two adjacent teeth, and the inner ring has a magnetic reluctance at the magnetic bridge greater than a magnetic reluctance at the positioning slot.

16. The single phase motor of claim 13, wherein a center of the positioning slot is offset from a symmetrical center of a corresponding pair of teeth by an electric angle ranging from 45 degrees to 135 degrees.

17. A single phase motor comprising:
a stator comprising a stator core and a stator winding wound around the stator core, the stator core comprising a plurality of teeth and pole shoes extending from inner ends of the teeth in circumferential directions, the pole shoes cooperatively defining a space there between; and
a rotor rotatably received in the space of the stator with an air gap formed between the pole shoes and the rotor for allowing the rotor to rotate relative to the stator, the rotor comprising magnetic poles arranged along a circumferential direction of the rotor,
wherein positioning slots are formed in pole shoes located between each pair of adjacent teeth, the positioning slots are covered by inner circumferential surfaces of the pole shoes, one edge of the positioning slot does not reach a part of the pole shoe facing the winding portion, opposite edge of the positioning slot does not reach an end of the pole shoe, such that when the stator winding is de-energized a middle radial line of the magnetic pole is offset from a middle radial line of a corresponding tooth, adjacent pole shoes are connected together to form a closed inner ring portion, an inner circumferential surface of the inner ring portion is located on a cylindrical circumferential surface, and a magnetic bridge is disposed at a part of the inner ring portion between each two adjacent teeth,
wherein each magnetic bridge is offset from the middle position in a direction away from the positioning slot.

* * * * *